(12) United States Patent
Kawai

(10) Patent No.: US 6,529,565 B1
(45) Date of Patent: Mar. 4, 2003

(54) CIRCUIT FOR DETECTING A CENTER ERROR TO CORRECT SAME

(75) Inventor: Kazuo Kawai, Tokyo (JP)

(73) Assignee: General Research of Electronics, Inc. (JP)

( * ) Notice: Subject to any disclaimer, the term of this patent is extended or adjusted under 35 U.S.C. 154(b) by 0 days.

(21) Appl. No.: 09/158,468

(22) Filed: Sep. 22, 1998

(30) Foreign Application Priority Data

Apr. 6, 1998 (JP) .......................................... 10-110193

(51) Int. Cl.⁷ .............................................. H04L 27/14
(52) U.S. Cl. ...................... 375/334; 375/272; 375/278; 375/316; 375/322
(58) Field of Search ................................ 375/334, 316, 375/322, 223, 211, 224, 272, 303, 273, 274, 275, 276, 277, 278; 330/259; 329/303, 300

(56) References Cited

U.S. PATENT DOCUMENTS 5,233,312 A  * 8/1993 Duft et al. .................. 330/259
5,436,590 A  * 7/1995 Simard et al. ............... 329/303
5,949,829 A  * 9/1999 Kawai ......................... 375/334
6,097,766 A  * 8/2000 Okubo et al. ................ 375/324

* cited by examiner

Primary Examiner—Shuwang Liu
(74) Attorney, Agent, or Firm—Trexler, Bushnell, Giangiorg, Blackstone & Marr, Ltd

(57) ABSTRACT

Since in a demodulated base band signal in an FSK receiver, etc. usually a DC offset is produced due to a frequency difference between a transmitter and a receiver, etc., which lowers demodulation margin, a circuit is constructed for detecting an error in a center level thereof to correct same in a simple manner. In this circuit, a bit synchronizing signal, which is at a beginning of a the base band signal $E_B$ is sampled twice with an interval of 1/(baud rate) sec and an average of two sampled values is obtained by applying sampled output pulses thus obtained to a holding capacitor in a hold circuit. In this way the error in the center level is detected and the center level is corrected by subtracting it from the base band signal in a subtracter.

4 Claims, 2 Drawing Sheets

CIRCUIT FOR DETECTING A CENTER ERROR TO CORRECT SAME

FIELD OF THE INVENTION

The present invention relates to techniques for constructing a circuit for detecting a center error to correct same for detecting an error in a center level of a base band signal such as a demodulated base band signal in an FSK (Frequency Shift Keying) receiver used in packet communication, etc.

DESCRIPTION OF THE PRIOR ART

In transmission of an FSK signal, which is a packet signal, if there is a difference between transmitted and received frequencies or if there is an error in a central frequency of a frequency discriminator, an error is produced in the center level of a demodulated base band signal, which lowers demodulation margin. Therefore, it is necessary to correct this center error and thus heretofore various circuits for detecting a center error have been conceived.

Followings are known for these methods.

As representatives thereof there are known 1) a method in which there are disposed a positive and a negative peak hold circuit and the center level is obtained, starting from an average of peak values held therein; 2) a method in which there are disposed a positive and a negative dead zone circuit having dead zone voltage widths, which are in accordance with a positive and a negative peak value width, respectively, of the base band signal, and the center error is obtained by taking out components outputted, exceeding these dead zone voltage widths, in the base band signal; 3) a method in which the center level obtained by integrating a bit synchronizing signal, which is at a beginning of the packet signal, over a 2 bit length (a period of time of 2/baud sec (baud being transmission speed)); 4) a method in which the bit synchronizing signal is sampled twice with an interval of 1/baud sec and the center level is obtained, starting from an average of these sampled values; etc.

However these methods have advantages and disadvantages as described below.

That is, by the method using the peak hold circuits described in 1) two circuits are required; similarly to 1), also by the method using the dead zone circuits described in 2) two dead zone circuits, positive and negative, are required; by the method utilizing integration described in 3) circuits controlling discharge, integration, holding, etc. are required in the integrating circuits; by the method described in 4) in which the average of two sampled values is obtained, two sample hold circuits are required, etc.

As described above, the prior art methods have drawbacks that two circuits having a same function or that a complicated control circuit is required.

SUMMARY OF THE INVENTION

An object of the present invention is therefore to provide a circuit capable of detecting an error in the center level of the base band signal with a simple function and construction.

A circuit for detecting a center error to correct same according to the present invention is characterized in that it comprises sampling means for sampling twice a bit synchronizing signal, which is at a beginning of a packet signal, with an interval of 1/(baud rate) sec; detecting means for detecting an error in the center level of the base band signal, using an average of two sampled values obtained by using sampling output pulses from the sampling means; and correcting means for subtracting the error in the center level from the base band signal.

In the present invention, the sampling means may include a voltage/current converter, which converts the base band signal voltage into a base band signal current; a carrier detector, to which the base band signal is inputted; a control pulse generator, which outputs control pulses for sampling an output of the carrier detector; and a sampler, which samples the base band signal current according to the control pulses for sampling, while the detecting means may consist of a hold circuit, which integrates current output sampled by the sampler.

Or, in the present invention, the sampling means may include an amplifier, which amplifies the base band signal; a carrier detector, to which the base band signal is inputted; a control pulse generator, which outputs control pulses for sampling an output of the carrier detector; and a sampler, which samples an output of the amplifier according to the control pulses for sampling; while the detecting means may consist of a low pass filter, which integrates an output sampled by the sampler.

Further, in the present invention, the base band signal may be a demodulated base band signal in an FSK receiver.

DESCRIPTION OF THE PREFERRED EMBODIMENTS

Figure 1:
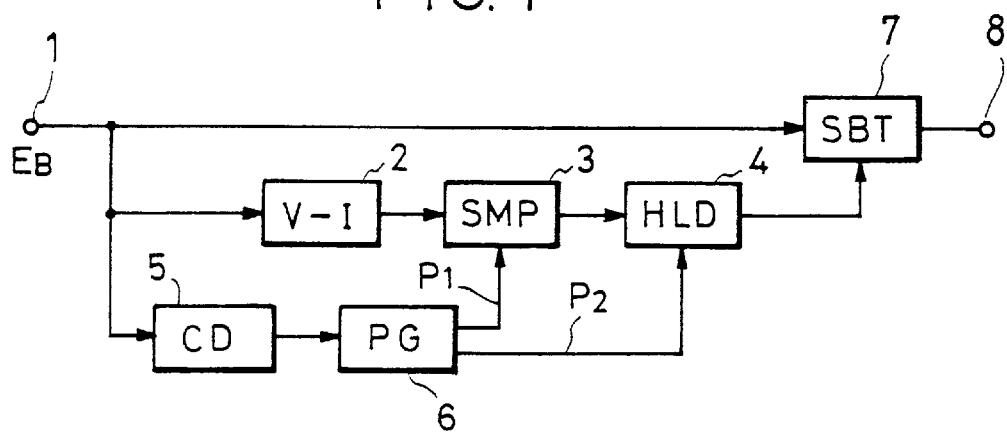
FIG. 1 is a circuit construction diagram for explaining an embodiment of the present invention.

The present invention utilizes a property of the method 4) described above that, since the bit synchronizing signal is a repeated signal with a period of 2/(baud rate) sec, an average of two sampled values with an interval of 1/(baud rate) sec., i.e. 180° in phase, is equal to the center level. By the method 4), since two hold circuits are used for obtaining the average of the values sampled at these two points separated in time, the above described property is valid inevitably. If this operation can be dealt with by using only one hold circuit, it is a matter of course that the circuit can be simplified correspondingly. In order to deal with the operation with one hold circuit, it is necessary that it has also an averaging function in common. For this purpose it is possible to obtain the average of the two values by making the most of the function of integrating current flowing through a holding capacitor.

According to the present invention the circuit is so constructed that an error in the center level is detected by obtaining the average by making the most of the function of integrating current flowing through a capacitor in the hold circuit or the low pass filter and that the base band signal is corrected by using this error difference.

Hereinbelow embodiments of the present invention will be explained, referring to the drawings.

FIG. 1 is a circuit construction diagram showing an embodiment of the circuit for detecting a center error to correct same according to the present invention. In FIG. 1, reference numeral 1 is an input terminal for the base band signal; 2 is a voltage/current converter (V-I); 3 is a sampler (SMP); 4 is a hold circuit (HLD); 5 is a carrier detector (CD); 6 is a control pulse generator (PG); 7 is a subtracting circuit (SBT); and 8 is an output terminal for the base band signal already corrected.

Now the operation of the circuit indicated in FIG. 1 will be explained, referring to the diagrams showing waveforms indicated in FIGS. 4 and 5.

Figure 3:
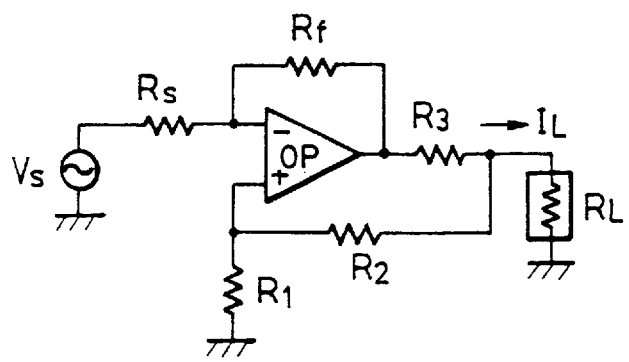
FIG. 3 is a circuit diagram showing an example of construction of a voltage/current converter, which is one of constituent elements indicated in FIG. 1.

The base band signal applied to the input terminal 1 is converted into a current signal by the voltage/current converter 2 to be applied to the hold circuit 4 through the sampler 3. The voltage/current converter 2 can be realized by using a well-known circuit as indicated in FIG. 3. In the same figure, $R_1 \sim R_3$, $R_f$, $R_s$ are resistors; OP is an operational amplifier; $V_s$ is an input voltage; and $I_L$ is an output current. When $R_s = R_1$ and $R_f = R_2 + R_3$, the input voltage $V_s$ is converted into an output current $I_L$ proportional thereto with a relationship of $I_L = V_s R_f / R_s R_3$.

Figure 4:
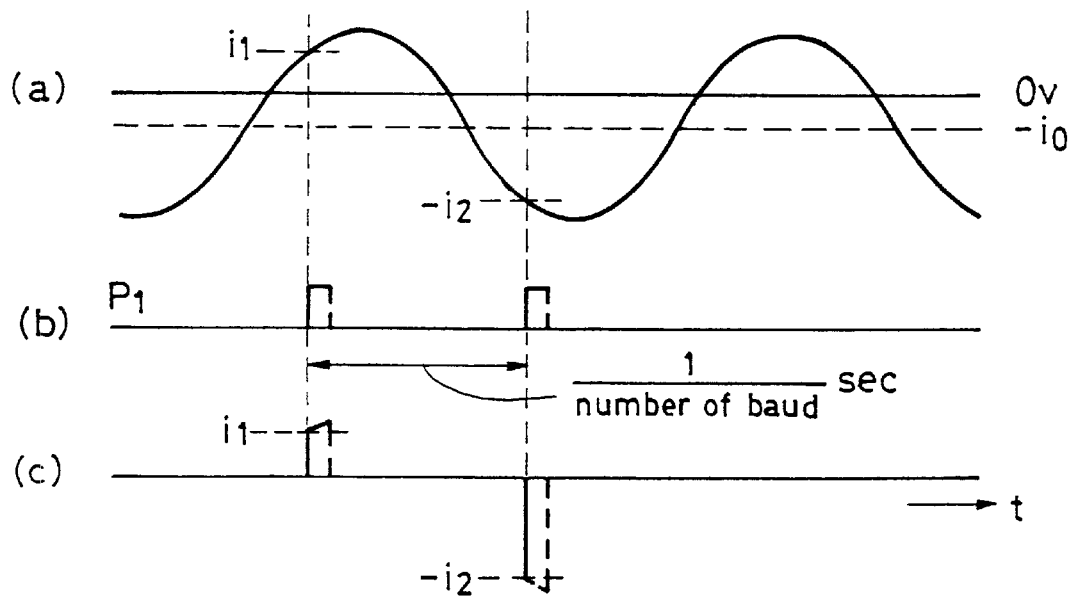
FIG. 4 shows waveforms for explaining an operation of the embodiment indicated in FIG. 1.

The sampler 3 samples twice the bit synchronizing signal (a) converted into current according to sampling pulse $P_1$ with an interval of 1/baud sec, as indicated in FIG. 4. Current outputs $i_1$ and $i_2$ thus sampled are applied to the hold circuit 4, which are integrated by a holding capacitor. Consequently, for the purpose of making this integrated output voltage greater, widths of the sampled pulses $i_1$ and $i_2$ are increased as indicated in (c) owing to increased widths of the sampling pulses $P_1$ as indicated by broken lines in FIG. 4(b) or an operational amplifier is disposed before the holding capacitor to use a capacitor having a gain.

A pulse $P_2$ applied to the hold circuit 4 is a reset pulse for discharging the holding capacitor in order to set output voltage at zero apart from periods of time where the sampled pulses should be held.

Figure 5:
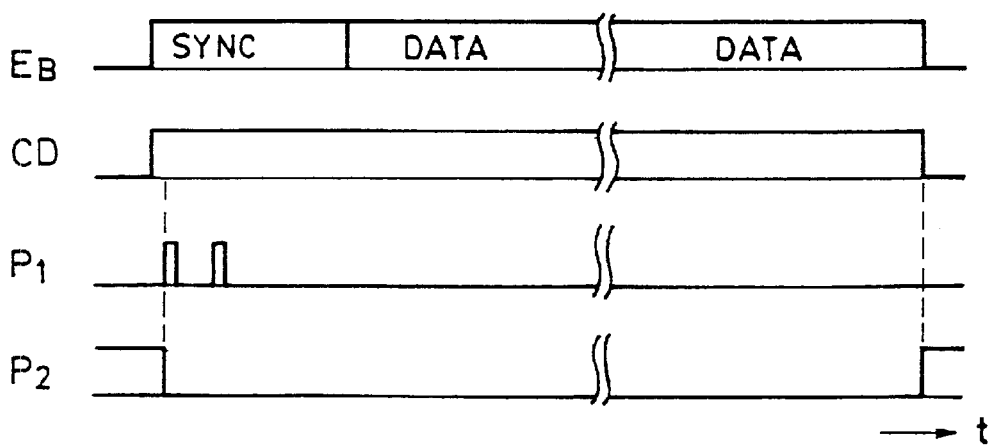
FIG. 5 shows waveforms for explaining an operation of the embodiment indicated in FIG. 1.

In order to execute the operation described above, when the base band signal $E_B$ indicated in FIG. 4(a) is applied to the input terminal 1 in FIG. 1, the carrier detector (CD) 5 detects carrier of the base band signal to produce an output signal indicated by CD in FIG. 5. The control pulse generator 6 is driven by this signal CD to produce the control pulse $P_1$ in FIG. 4.

In this way, it is possible to obtain a voltage in the output of the hold circuit 4, which is equal to the error in the center level of the base band signal. Therefore it is possible to obtain a correct base band signal having no offset through the output terminal 8 by subtracting the voltage equal to the error difference in the center level from the inputted base band signal voltage in the subtracter 7.

Figure 2:
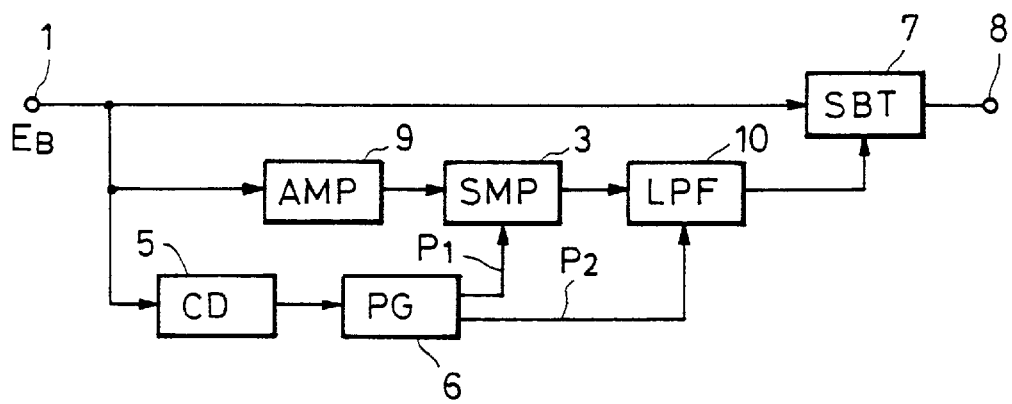
FIG. 2 is a circuit construction diagram for explaining another embodiment of the present invention, in case where it is tried to simplify a circuit by replacing an integration operation by an approximate operation.

FIG. 2 shows another embodiment of the present invention, in which an approximate integration is effected by using a low pass filter 10 (consisting of a resistor and a capacitor), while an exact integration of the sampled output pulses $i_1$ and $i_2$ is effected by using the voltage/current converter 2 and the holding capacitor in the hold circuit 4 in the embodiment in FIG. 1. In this case, since precision of the approximation of the integration is improved, if an inputted voltage applied to the low pass filter 10 is satisfactorily high with respect to an output voltage thereof, an amplifier 9 (AMP) is used.

As described above in detail, according to the present invention, since a DC offset voltage (error in the center level) of the base band signal produced due to a frequency difference between transmitted and received signals, etc. in an FSK receiver used in packet communication, etc. can be detected in an extremely simple manner, it is possible to correct easily the error in the center level and to increase demodulation margin at most.

What is claimed is:

1. A circuit for detecting and correcting a center error comprising:

sampling means for sampling twice a bit synchronizing signal, which is at a beginning of a packet signal, with a sampling interval of 1/(baud rate) sec;

detecting means for detecting an error in the center level of a base band signal, using an average of two sampled values obtained by using sampling output pulses from said sampling means; and correcting means for subtracting said error in the center level from said base band signal, wherein said sampling means includes:
a voltage/current converter, which converts a base band signal voltage into a base band signal current;
a carrier detector, to which said base band signal is inputted;
a control pulse generator, which outputs control pulses for sampling according to an output of said carrier detector; and
a sampler, which samples said base band signal current according to said control pulses for sampling; while said detecting means comprises a hold circuit, which integrates the output of said sampler.

2. A circuit for detecting and correcting a center error comprising:

sampling means for sampling twice a bit synchronizing signal, which is at a beginning of a packet signal, with a sampling interval of 1/(baud rate) sec;

detecting means for detecting an error in the center level of a base band signal, using an average of two sampled values obtained by using sampling output pulses from said sampling means; and correcting means for subtracting said error in the center level from said base band signal, wherein said sampling means includes:
an amplifier, which amplifies said base band signal;
a carrier detector, to which said base band signal is inputted;
a control pulse generator, which outputs control pulses for sampling according to an output of said carrier detector; and
a sampler, which samples an output of said amplifier according to said control pulses for sampling; while said detecting means comprises a low pass filter, which integrates the output of said sampler.

3. A circuit for detecting and correcting a center error according to claim 1, wherein said base band signal is a demodulated base band signal in an FSK receiver.

4. A circuit for detecting and correcting a center error according to claim 2, wherein said base band signal is a demodulated base band signal in an FSK receiver.

* * * * *